No. 638,197. Patented Nov. 28, 1899.
G. T. HIGGINS.
DENTAL CHAIR.
(Application filed Feb. 4, 1897.)
(No Model.) 5 Sheets—Sheet 5.
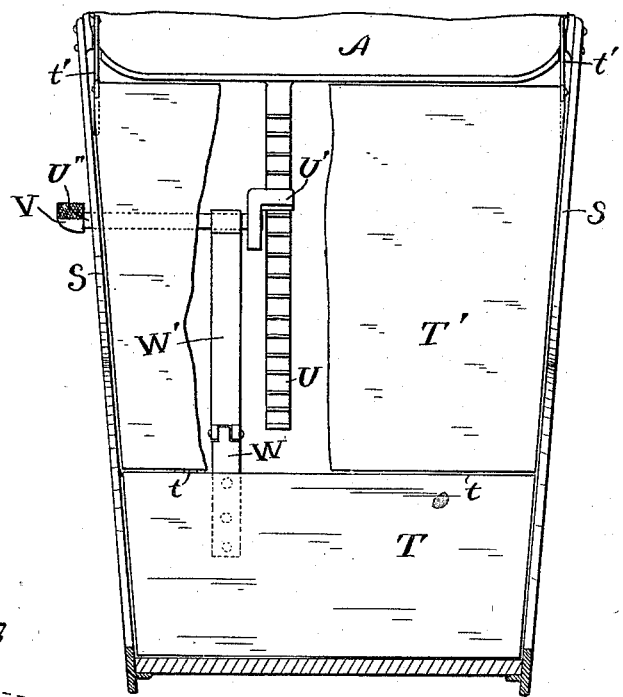
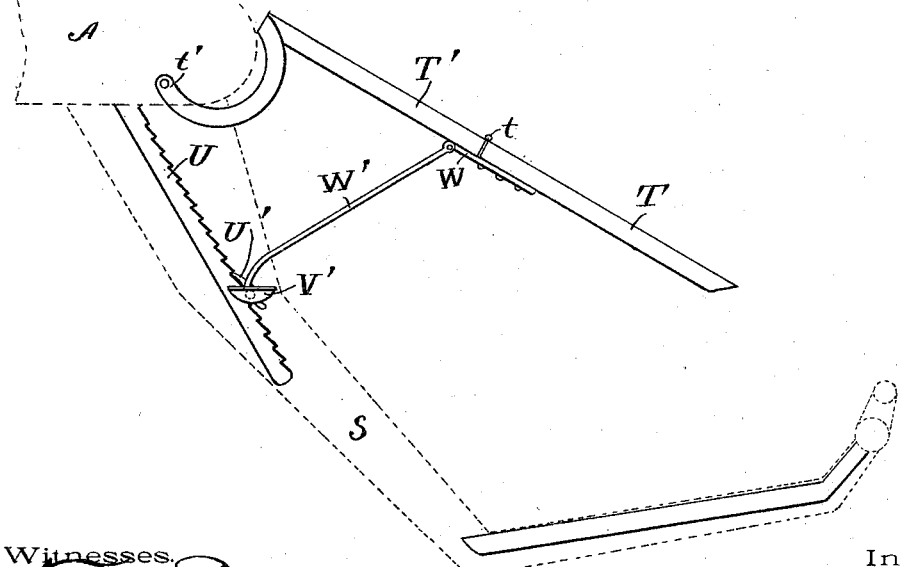
Witnesses.
Inventor.
George T. Higgins
By Erwin Wheeler & Wheeler
Attorneys

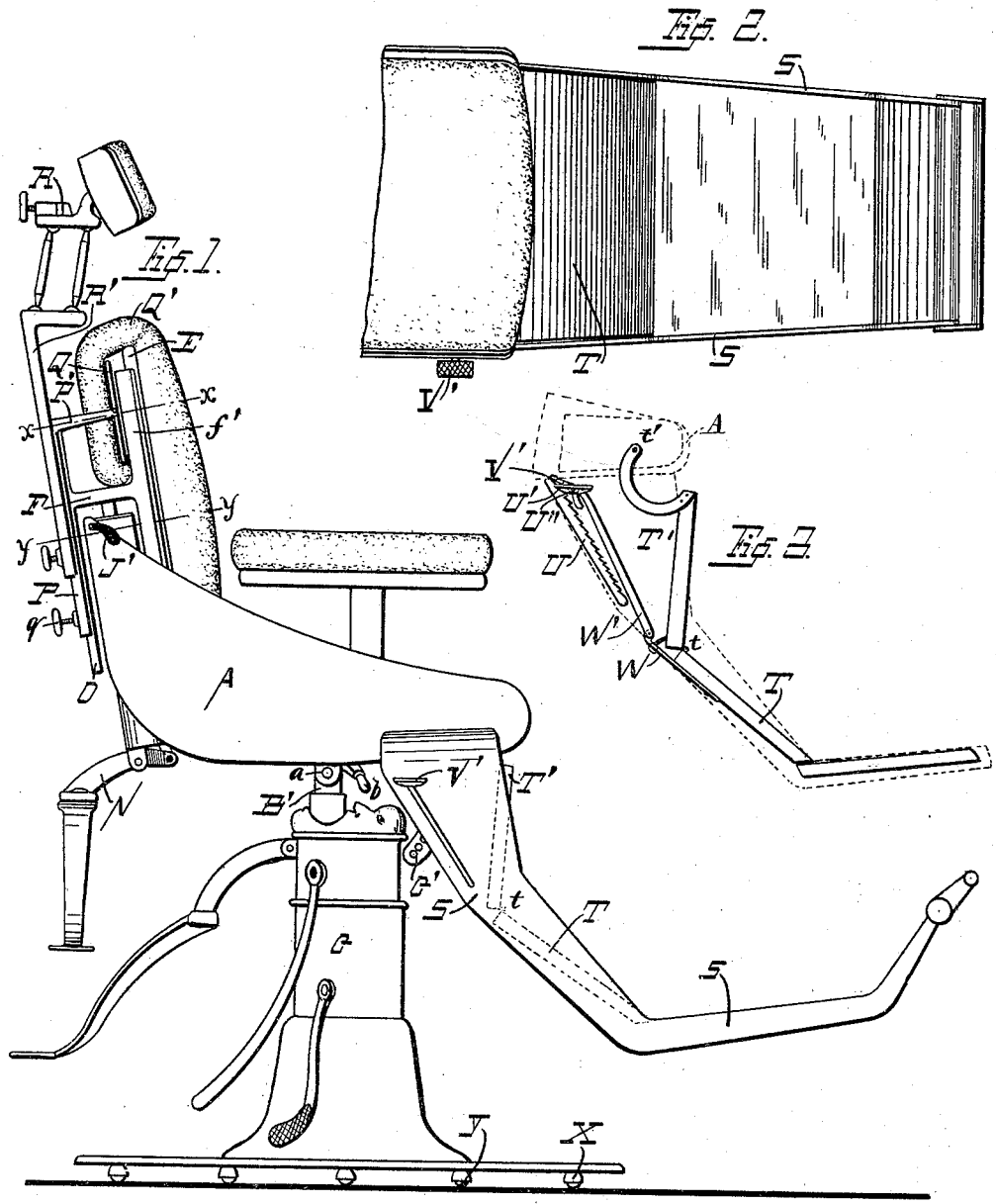

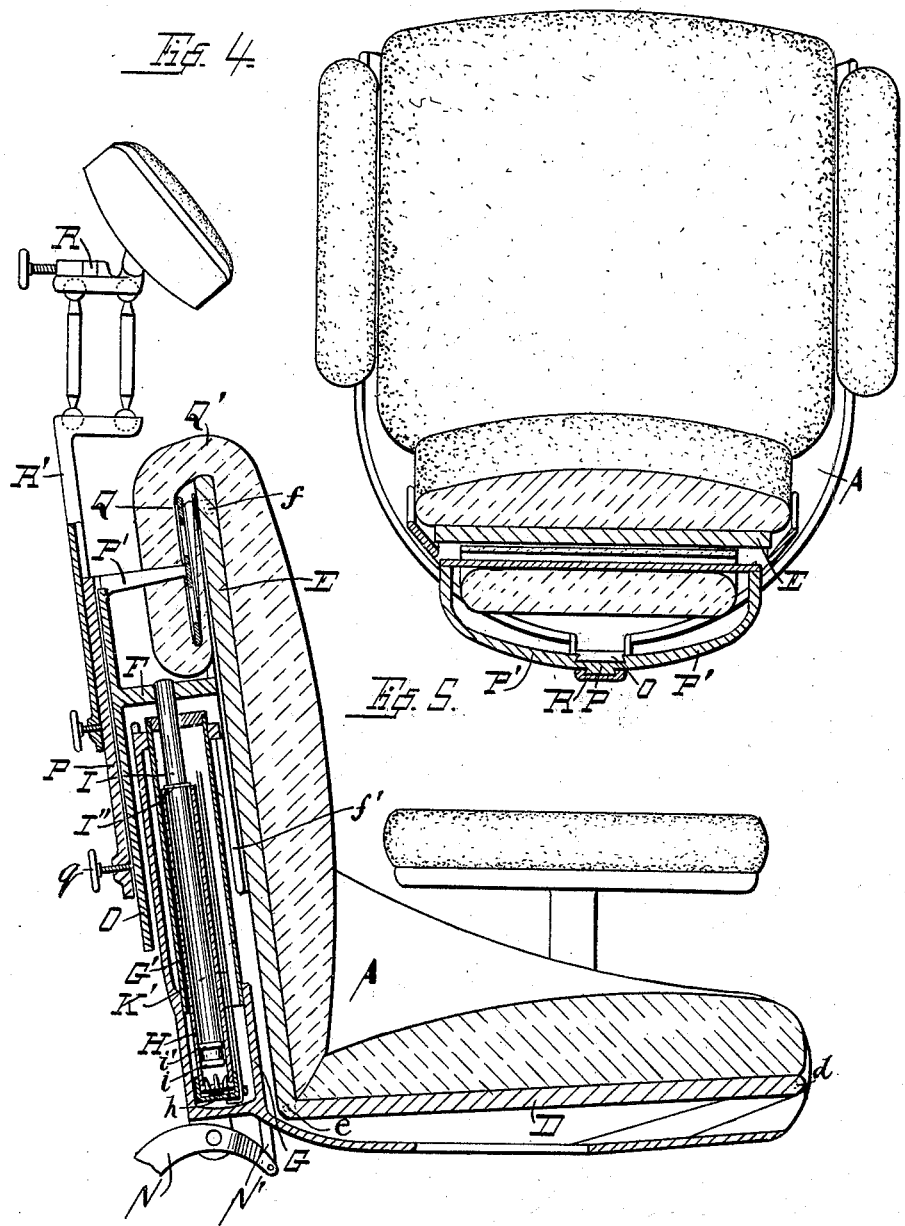

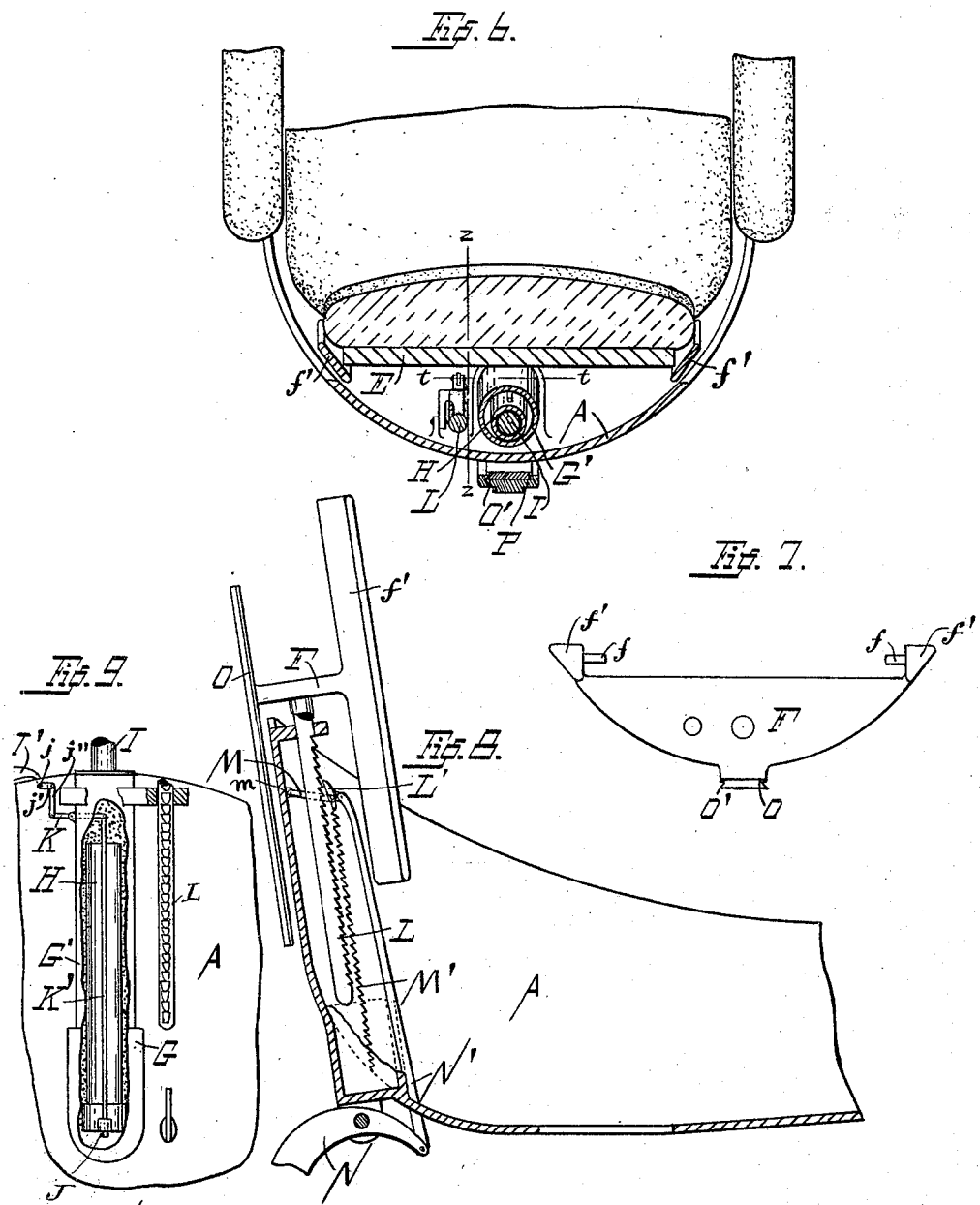

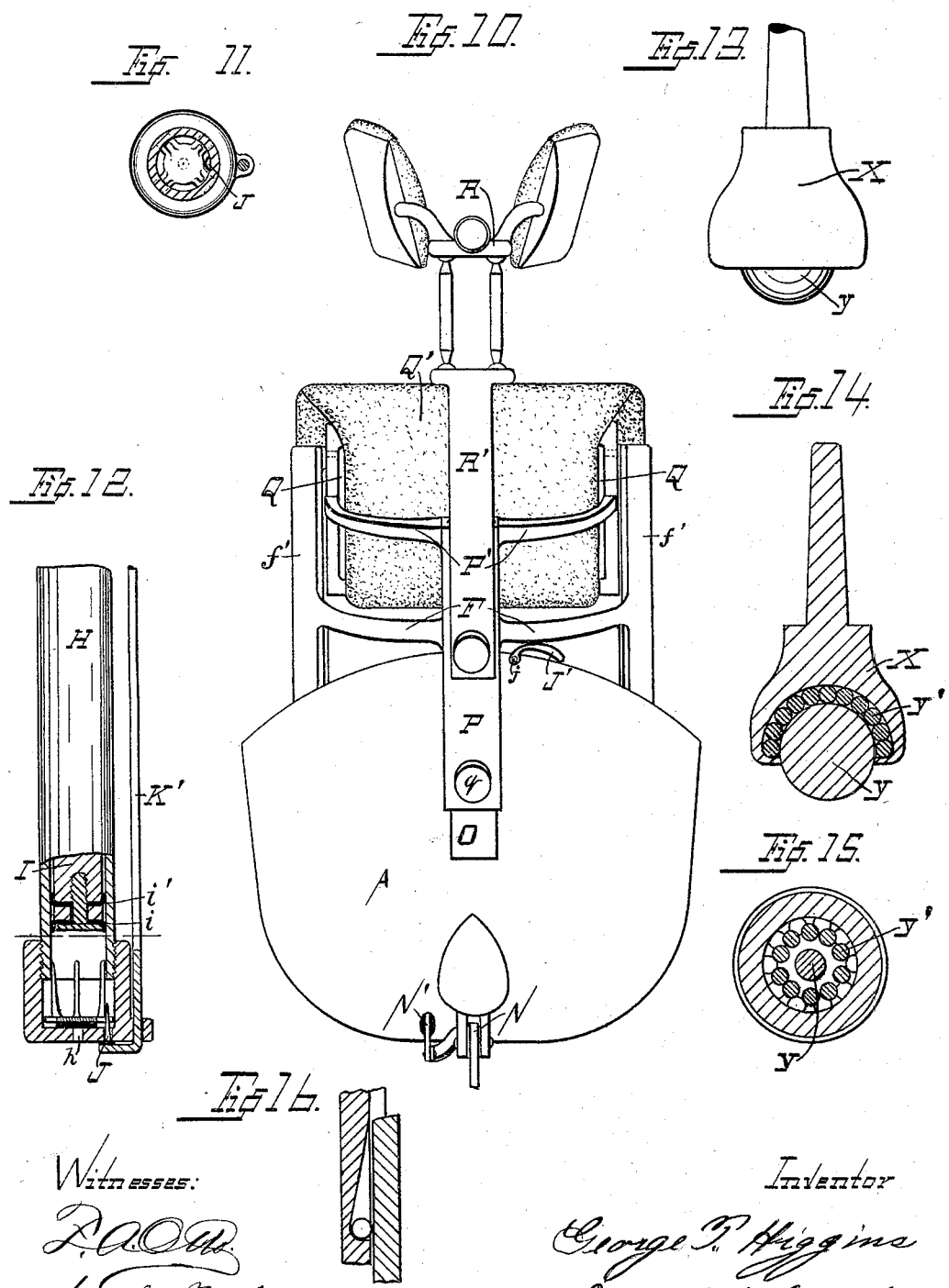

UNITED STATES PATENT OFFICE.

GEORGE T. HIGGINS, OF MILWAUKEE, WISCONSIN.

DENTAL CHAIR.

SPECIFICATION forming part of Letters Patent No. 638,197, dated November 28, 1899.

Application filed February 4, 1897. Serial No. 621,963. (No model.)

*To all whom it may concern:*

Be it known that I, GEORGE T. HIGGINS, a citizen of the United States, residing at Milwaukee, in the county of Milwaukee and State of Wisconsin, have invented new and useful Improvements in Dental Chairs, of which the following is a specification.

My invention relates to improvements in dental chairs.

The objects of my invention are, first, to provide improved means for adjusting the chair, and, second, to provide means for converting the same into an operating-table.

In the following description reference is had to the accompanying drawings, in which—

Figure 1 is a side view of my improved chair. Fig. 2 is a top view of the foot-rest. Fig. 3 is a detail section view of the same. Fig. 4 is a top view in section, drawn on the line $x$ $x$ of Fig. 1. Fig. 5 is a central vertical longitudinal section view with the main standard and base-plate omitted. Fig. 6 is a partial top view in section, drawn on the line $y$ $y$ of Fig. 1. Fig. 7 is a detail top view of the cross-head of the jack for supporting the back of the seat. Fig. 8 is a detail vertical section of the lifting-jack, drawn on the line $z\,z$ of Fig. 6. Fig. 9 is a view of the outer or rear section, drawn on the line $t\,t$ of Fig. 6. Fig. 10 is a rear view of the chair-back. Figs. 11 and 12 are cross and vertical sectional views, respectively, of the lower portion of the piston-cylinder. Figs. 13, 14 and 15 are side and section views of my improved form of caster. Fig. 16 is a section view in detail, illustrating a modified form of locking device for the standard P. Fig. 17 is an enlarged front view of the foot-rest with the forward portion thereof removed, on a line along the lower edge of the member T, and with a portion of the member T' broken away to show the actuating mechanism. Fig. 18 is a side view similar to that given in Fig. 3, but also enlarged, and with the parts T and T' shown in the opposite extreme.

Like parts are identified by the same reference-letters throughout the several views.

The chair-seat is located within a cast body A, which is hinged to and supported at $a\,a$ on the cross-head B of a plunger B' of a jack located in the standard C. The chair-body is tilted on its pivotal support to the desired position and is held in place by a bell-crank lever $b$, carried by the cross-head B, and having a pin which engages in holes or notches in a bracket C', carried by the body A. These parts, as well as the mechanism for operating the jack, may be of any ordinary construction, and are therefore not described with particularity.

The seat D and seat-back E are hinged together at $e$, and the seat is at its front end pivotally attached to the body at $d\,d$, the seat-back E being supported at its upper end by the studs $f$ of the vertical bars $f'$, attached to the cross-head F of the adjusting-jacks located in the rear portion of the body A.

As a preferred form of lifting-jack, the cross-head F is provided with a depending rack-bar L, located at one side of the piston-cylinder and adapted to be engaged by a bell-crank pawl L', pivoted at the outer end of a lever M, which is fulcrumed to the body of the chair at $m$. The pawl L' is normally held out of engagement with the rack by means of a retracting-spring M.'

N is a foot-lever for lifting the rack, connected to the outer arm of the bell-crank by a rod N' and adapted by its initial movement to throw the pawl into engagement with the rack and by its continued movement to lift the rack, with the cross-head and back, to the chair upon the lever M. On removing the foot the levers are restored to their normal positions by the spring M', and the cross-head is sustained in its raised position by the liquid which enters the cylinder of the lowering-jack, as hereinafter described.

In the lowering-jack, G is a liquid-chamber provided with a cylindrical extension G'. H is a piston-cylinder located in the cylinder G' and provided with a valved inlet $h$ at its lower end, through which the liquid enters the cylinder during the upward movement of the piston. I is the plunger or piston, to the upper end of which the cross-head F is attached, and J is a small pin-valve in the bottom of the cylinder H, actuated from the lever J' by means of a rod $j$, arm $j'$, link $j'''$, lever K, and connecting-rod K' to slowly release the liquid from the piston-cylinder when it is desired to lower the chair-back. The lower end of the piston-rod is provided with leather or rubber rings $i\,i'$, which serve as a packing, and near the upper end of the rod is a movable washer I'', which prevents the liquid from following the rod to its upper extremity.

For extending the back I have provided the cross-head F with a vertically-disposed bar O, offset rearwardly from the cross-head sufficiently to clear the chair-body at its lower end and provided at its outer surface with a dovetail flange O'. This flange is slidingly engaged by the counterpart flanges of a standard P, the latter being provided with arms P' at its upper end, adapted to support a frame Q in the rear of the upper end of the seat-back.

The upholstery Q' is extended over the back of the seat and looped over and around the frame, as shown in Figs. 1 and 10, with its end attached to the upper end of the seat-back in front of the frame. That portion of the upholstery between the frame and the back of the seat consists merely of the web or covering without any filling.

It will be observed that as the upholstery is attached to the back of the seat at both ends and merely looped around the frame the effect of raising the frame above the seat-back is to draw that portion of the upholstery which is in the rear of the frame over the top and onto the front side, the upward-projecting portion of the raised frame being thus covered by the upholstery and forming a continuation of the back of the seat. The extension of the upholstery on the front side of the frame will of course correspond with the shortening of the web underneath the frame or between the frame and the seat-back as this portion is drawn out upon the rear side of the frame.

The standard is locked at any desired point of adjustment by means of a set-screw $q$ or by a ball $q'$, located in a wedge-shaped socket, as shown in Fig. 16. With the latter construction the standard can be pulled up readily, but can only be lowered by first raising it slightly and then depressing it with a quick movement or jerk, which will cause the ball to slip.

The head-rest R is supported by a standard R', adjustably attached to the outer surface of the standard P in the same manner as the standard P is supported on the bar O.

The foot-rest of my chair is provided with an angularly-shaped casting S, depending from the front end of the body A. Within this casting I have located an adjustable frame comprising two members T and T', hinged together at $t$ and to the body A at $t'$. For adjusting this frame I have provided the casting with a rack U in the rear of the member T' of the frame, and this rack is engaged by a pawl U', attached to a rod U'', which extends to the side of the casting S and is provided with a foot-plate V' on the exterior, the parts being provided with suitable guides to prevent cramping. A bar W, attached to the lower member T of the foot-frame, is also attached to the rod U'' by a connecting-bar W', so that the downward movement of the foot-plate V', with the rod U'' and pawl U', will cause the members T and T' to swing out on the hinges $t'$ away from the casting. With the continued downward movement of the foot-plate the members T and T' are alined, as shown in Fig. 18. The connecting-bar W' swings outwardly and stands at a considerable angle to the rack U, thus furnishing a brace for the alined members T and T'.

In manipulating my chair, assuming the parts to be in the position shown in Fig. 1 and it being desired to adjust them to the other extreme in order to form an operating-table, I first extend the back by loosening the set-screw $q$ and raising the standard P, with its supported frame Q, above the back of the seat. The head-rest being supported from the standard P will be raised with it, but can then be adjusted independently by readjusting the standard R upon the standard P. The standards being locked in the desired positions by means of set-screws, I tilt the chair backwardly upon the cross-head B of the base-standard, and then by applying the pressure of the foot to the lever N of the lifting-jack above described the pawl L' is actuated to engage with and lift the rack L, with the cross-head F and the back of the chair-seat supported therefrom. The seat being hinged to the back at its rear end will also be tilted upon its pivotal supports $d\ d$, and with the continued upward movement caused by the lifting-jack the seat and its back will be brought into substantial alinement. The force applied to the foot-lever N may be removed at intervals, if desired, and the entire chair readjusted or additionally tilted upon the cross-head B in accordance with the altered position of the seat. If the parts of the foot-frame be now adjusted outwardly and alined, they will also be alined with the seat and its back, and the chair being sufficiently tilted upon the cross-head B of the main standard the alined parts will be brought into a horizontal position, thus forming an operating-table which may be adjusted to any desired height by means of the jack in the main standard. It will be observed that when the lever N is actuated to lift the cross-head F the piston I of the lowering-jack, which depends from the cross-head, will also be lifted, thus drawing the liquid into the cylinder H through the check-valve $h$ and furnishing means for supporting the cross-head when the pressure is removed from the foot-lever. When it is desired to restore the chair to its original position, the lever J' is shifted to actuate the pin-valve J to slowly release the oil from the piston-cylinder, and the chair gradually reassumes its position as a seat without shock or jar. The chair is then tilted forwardly and the foot-frame lowered to its original position by tilting the foot-plate to release the pawl, thus restoring the chair to its normal position.

It will be understood that the object of providing separate lifting and lowering mechanism for the seat and its back is to enable the parts to be quickly adjusted in the horizontal position and slowly readjusted to the upright position. Thus I am enabled by successive movements of the foot-lever N to raise the back of the chair sufficiently to aline the back and its seat, while the return movement, due to the escape of the liquid from the piston-cylinder, is very slow and gradual, and for this reason I prefer to use the lever-actuated lifting-jack instead of pumping the liquid into the piston-cylinder for the purpose of raising the back, as would be the case with an ordinary hydraulic jack.

It is evident that when the chair is used as a table it is often desired to change its position in the room, and the ordinary form of caster is found inadequate, as requiring too great an exercise of force to start it, and when started it often moves suddenly and jars the patient. I have therefore provided an improved form of caster, which consists in a shank X, provided with a socket in which the ball-roller Y is set upon a bearing of small balls Y'. The balls are held in place by an inwardly-converging shoulder, burnished or compressed to form a close bearing for the ball-roller at a point below its center.

Having thus described my invention, what I claim as new, and desire to secure by Letters Patent, is—

1. In a dental chair, the combination with the body A, located upon a pivotal support, a seat fulcrumed at its front end to the body, a seat-back hinged at its lower end to the chair-seat, one or more adjusting-jacks, located in the rear of said seat-back and provided with a cross-head from which the upper end of the seat-back is pivotally supported, substantially as described.

2. In a dental chair, the combination with the body A, located upon a pivotal support, of a seat fulcrumed at its front end to the body, a seat-back hinged at its lower end to the chair-seat and one or more adjusting-jacks, located in the rear of the seat-back and provided with a cross-head having upwardly-projecting arms, adapted to pivotally support the seat-back at its upper end, substantially as described.

3. In a dental chair, the combination with the body A, located upon a pivotal support, of a chair-seat fulcrumed at its front end to the body, a seat-back hinged at its lower end to the chair-seat, a lever-actuated lifting-jack and a hydraulic lowering-jack, located in the rear of the chair-seat, and a cross-head for said jacks provided with arms adapted to pivotally support the seat-back, substantially as described.

4. In a dental chair, the combination with the body A, located upon a pivotal support, of a seat fulcrumed at its front end to the body, a seat-back hinged at its lower end to the seat, one or more jacks, located in the rear of said seat-back and provided with a cross-head, from which the upper end of said seat-back is pivotally supported, a standard adjustably attached to the said cross-head, and an extension-frame supported therefrom, over which the upholstery is looped, whereby as said standard is raised, the back of the chair-seat is extended, substantially as described.

5. In a dental chair, the combination with the body A, located upon a pivotal support, of a seat, fulcrumed at its front end to the body, a seat-back hinged at its lower end to the seat, one or more adjusting-jacks, located in the rear of said seat-back and provided with a cross-head from which the back is supported, and an extension-frame adjustably supported from the cross-head, over which the upholstery is looped, whereby said seat-back may be extended or shortened at pleasure, substantially as described.

6. In a dental chair, the combination with the body A, located upon a suitable support, of a seat and its back located therein, one or more jacks for adjusting the position of the seat and its back, a vertically-disposed bar connected with the movable portion of said jack or jacks, an extension-frame for the seat-back, adjustably attached to the said bar, and suitable upholstery looped over said extension-frame and attached to the seat-back at both ends, substantially as described.

7. In a dental chair, the combination with the seat-back, of a movable extension-frame, located in the rear thereof, and suitable upholstery looped over said frame and attached at both ends to the back of the seat, substantially as described.

8. In a dental chair, the combination with the seat-back, of a movable extension-frame, located in the rear thereof, suitable upholstery looped over said frame and attached at both ends to the back of the seat, and a head-rest adjustably attached to the supporting-standard of the extension-frame, substantially as described.

9. In a dental chair, a foot-rest, comprising a cast body rigidly secured to the body of the chair, a jointed foot-frame pivoted to the body of the chair and depending therefrom, a bar secured to the lower member of the foot-frame, and a connecting-bar hinged thereto, a rocking shaft supported from the upper end of the connecting-bar and projecting laterally at the side of the foot-frame, a depending rack secured to the casing, and a pawl attached to the rocking shaft and adapted to engage said rack, whereby with the downward movement of said shaft and pawl, the members of the foot-frame are thrown outwardly and alined, and supported in that position, substantially as described.

10. In a dental chair, the combination of a body, located upon an adjustable support, a seat and seat-back, hinged together, with the front end of the seat fulcrumed upon the chair-body, and an adjustable support for the seat-back, adapted to lift the same in relation to the chair-body, to aline the seat and its back, substantially as described.

11. In a dental chair, the combination of a body, located upon an adjustable support, a seat and seat-back, hinged together, with the seat fulcrumed at its front end upon the chair-body, an adjustable support for the seat-back, adapted to lift the same in relation to the chair-body, to aline the seat and its back and an adjustable foot-frame, adapted to be alined with the seat and its back, said body being arranged to tilt upon its support sufficiently to bring the alined parts into a horizontal position, substantially as described.

In testimony whereof I affix my signature in the presence of two witnesses.

GEORGE T. HIGGINS.

Witnesses:
  JAS. B. ERWIN,
  LEVERETT C. WHEELER.